(12) United States Patent
Rosenan et al.

(10) Patent No.: US 8,954,624 B2
(45) Date of Patent: Feb. 10, 2015

(54) METHOD AND SYSTEM FOR SECURING INPUT FROM AN EXTERNAL DEVICE TO A HOST

(75) Inventors: Avner Rosenan, Yehud (IL); Zvi Gutterman, Jerusalem (IL); Dor Skuler, Philadelphia, PA (US); Gil Sever, Rosh-Haayin (IL)

(73) Assignee: Safend Ltd., Tel Aviv (IL)

( * ) Notice: Subject to any disclaimer, the term of this patent is extended or adjusted under 35 U.S.C. 154(b) by 717 days.

(21) Appl. No.: 12/089,128

(22) PCT Filed: Oct. 4, 2006

(86) PCT No.: PCT/IL2006/001158
§ 371 (c)(1),
(2), (4) Date: Dec. 23, 2008

(87) PCT Pub. No.: WO2007/039904
PCT Pub. Date: Apr. 12, 2007

(65) Prior Publication Data
US 2009/0125646 A1 May 14, 2009

Related U.S. Application Data

(60) Provisional application No. 60/596,616, filed on Oct. 6, 2005, provisional application No. 60/766,231, filed on Jan. 3, 2006.

(51) Int. Cl.
*G06F 3/00* (2006.01)
*G06F 13/00* (2006.01)
(Continued)

(52) U.S. Cl.
CPC .............. *G06F 21/606* (2013.01); *G06F 21/82* (2013.01)
USPC ................... 710/15; 710/16; 710/17; 710/18; 710/19; 710/32; 713/189; 713/192; 713/194; 713/300; 726/2; 726/16; 726/20; 726/22; 726/23; 726/34; 726/35

(58) Field of Classification Search
USPC ..................... 710/15–19, 62, 32, 10; 713/189, 713/192–194, 202, 300; 726/34–35, 2, 16, 726/20, 22–23
See application file for complete search history.

(56) References Cited

U.S. PATENT DOCUMENTS 4,930,096 A * 5/1990 Shimizu et al. .......... 340/825.52
5,406,624 A * 4/1995 Tulpan .......................... 713/192
(Continued)

FOREIGN PATENT DOCUMENTS

| WO | WO 2005/003932 | 1/2005 |
| WO | WO 2005/054973 | 6/2005 |
| WO | WO 2006/073702 A1 | 7/2006 |

OTHER PUBLICATIONS http://www.usb.org/developers/docs, "Universal Serial Bus Specification Revision 2.0", Chapters 1, 3, 4 and 9 (9.1 USB Device States, 9.2 Generic USB Device Operations and 9.7 Device Class Definitions), Apr. 27, 2000.
(Continued)

*Primary Examiner* — Farley Abad
*Assistant Examiner* — Henry Yu
(74) *Attorney, Agent, or Firm* — Pearl Cohen Zedek Latzer Baratz LLP

(57) ABSTRACT

The pureness of a connection between an external device and a host computer can be inspected or monitored to determine the status: connected or disconnected. When it is determined that a disconnection state is entered, an indication can be sent to the host and, in parallel, the data transportation from and/or to the external device may be manipulated. In some embodiments an exemplary connection protector device (CPD) may be added to the connection in between the external device and the host. The CPD can have two connectors one for the host and one for the cable of the external device. The CPD can be adapted to identify any disconnection in the connection with the host and/or the connection with the external device on the other side of the CPD.

19 Claims, 8 Drawing Sheets

(51) Int. Cl.
*G06F 11/30* (2006.01)
*G06F 1/00* (2006.01)
*G06F 7/04* (2006.01)
*G06F 11/00* (2006.01)
*G06F 1/26* (2006.01)
*G06F 21/60* (2013.01)
*G06F 21/82* (2013.01)

(56) References Cited

U.S. PATENT DOCUMENTS

| | | | |
|---|---|---|---|
| 5,812,536 A * | 9/1998 | Manduely | 370/282 |
| 5,815,577 A * | 9/1998 | Clark | 380/52 |
| 5,960,172 A * | 9/1999 | Hwang | 726/34 |
| 6,019,281 A * | 2/2000 | Emmett et al. | 235/375 |
| 6,128,743 A * | 10/2000 | Rothenbaum | 713/300 |
| 6,628,517 B1 * | 9/2003 | Helot et al. | 361/679.4 |
| 6,745,330 B1 * | 6/2004 | Maillot | 726/35 |
| 7,032,240 B1 * | 4/2006 | Cronce et al. | 726/2 |
| 7,185,132 B2 * | 2/2007 | Tang | 710/305 |
| 7,284,278 B2 * | 10/2007 | Anson et al. | 726/34 |
| 7,299,303 B2 * | 11/2007 | Calligaro et al. | 710/10 |
| 7,778,924 B1 * | 8/2010 | Ananda | 705/50 |
| RE41,961 E * | 11/2010 | Chu | 713/193 |
| 8,024,500 B2 * | 9/2011 | Varanda et al. | 710/62 |
| 8,307,055 B2 * | 11/2012 | Banga | 709/222 |
| 8,782,767 B2 * | 7/2014 | Hill | 726/9 |
| 2004/0003262 A1 * | 1/2004 | England et al. | 713/189 |
| 2004/0088449 A1 * | 5/2004 | Sakaki | 710/15 |
| 2005/0138433 A1 * | 6/2005 | Linetsky | 713/202 |
| 2005/0273440 A1 * | 12/2005 | Ching | 705/64 |
| 2006/0107073 A1 * | 5/2006 | Lane et al. | 713/194 |

OTHER PUBLICATIONS http://www.tellus.com.tw/supporting /U11.pdf, "Wireless LAN USB Dongle User's Manual", Manufacturer, 2001.
International Search Report for International Application No. PCT/IL06/01158 mailed Jul. 22, 2008.
Extended European Search report of European application 06796151.6, mailed May 27, 2011.

* cited by examiner

METHOD AND SYSTEM FOR SECURING INPUT FROM AN EXTERNAL DEVICE TO A HOST

CROSS-REFERENCE TO RELATED APPLICATIONS

This application is a National Phase Application of PCT Application No. PCT/IL2006/001158, entitled "METHOD AND SYSTEM FOR SECURING INPUT FROM AN EXTERNAL DEVICE TO A HOST", International Filing Date Oct. 4, 2006, published on Apr. 12, 2007 as International Publication No. WO 2007/039904, which in turn claims priority from U.S. Provisional Patent Application No. 60/596,616, filed Oct. 6, 2005 and U.S. Provisional Patent Application No. 60/766,231, filed Jan. 3, 2006, all of which are incorporated herein by reference in their entirety.

BACKGROUND OF THE INVENTION

The present invention relates to the field of security of data communication between an external device and a host computer, and, more particularly, to securing the communication between a host and an external device in such a manner that the host can authenticate the external device and the data transportation over the connection is encrypted.

Commercial corporations, enterprises, organizations, such as government, health, military, financial, etc., continually face the risk that a hostile entity may listen to communications between an external device and its host computer. An exemplary host may be a personal computer, a workstation, a desktop computer, mainframe computer, blade server (e.g. CITRIX), dumb terminal, etc. or any other type of computing device that can be connected over a private network. For example, an external device such as a keyboard can give rise to such a risk. The risk is apparent for communication that occurs between the keyboard and the host to which it is connected (i.e., via a Universal Serial Bus (USB) connector). A hostile entity that operates to listen to the communication between the keyboard and the host may gain valuable information, such as passwords, user names, bank account numbers, etc. This information may be used later to damage the organization. Information regarding the details of operation and specifications of USB technology can be found in web site www.usb.org, the content of which is incorporated herein by reference.

Listening to the data transportation over a connection between an external device and its host may be done by temporarily disconnecting the external device from its socket and placing a hardware intrusions (also known as bugs) onto the socket and reconnecting the external device to a socket at the other side of the hardware bugs, using the hardware bugs as an extender of the socket. An exemplary hardware bug can be a device known as 'keylogger'. A keylogger is a small hardware device that can be plugged between the cable of a USB keyboard and the USB connector. A keylogger can be purchased from a 'spy shop'. Placing and removing the keylogger is simple and fast and can be done by cleaning staff, for example. After being removed from its victim computer, the recorded information can be retrieved from the keylogger and processed by the hostile entity. Another hardware bug that can be used in this scenario is a transmitter instead of keylogger. Such a device can detect and transmit the data transported over the connection, to a receiver that collects and stores the information. Such a transmitter can intercept a connection between a printer and its host, or an external disc and its host, etc.

There are several methods that have been introduced in an effort to overcome this security problem. One method posed to address this problem is the use a software program that generates a virtual keyboard for display on a screen on which the user is requested to enter his password by using a pointing device, such as a mouse, instead of the keyboard. This method is limited by the fact that it can be utilized during certain periods of time and cannot be used for the entire activity of a user.

Another method posed to address this problem is disclosed in international publication number WO 2005/003932 the content of which is incorporate herein by reference. This method offers a low-cost portable cipher and authenticator device that can be plugged in between a keyboard and a USB connector. During common operation the device is transparent. The device is activated only during periods in which a password or other classified information is entered. The cipher encrypts the data associated with the keystrokes and transfers the encrypted data to the host. The host can store the data and transfer it to a server that requested the classified information. In the disclosed method, the host cannot decrypt the information; only the server can decrypt it.

Another technique that has been posed to address this problem includes gluing the connector of the external device to its socket in the host computer. This method eliminates placing a hardware bug between the socket and the cable, however this technique, in essence operates to convert the two units, the host and the external device, into single device. It should be appreciated that this may create difficulties when one of the devices needs to be replaced or transported. Yet another existing option is using a secured keyboard, such as a keyboard that includes an encryption mechanism. In such embodiments, the recorded/transmitted data is encrypted and cannot be used by the hostile entity.

Furthermore, current secured keyboards do not typically include authentication mechanisms. Therefore a hostile entity that wishes to collect information from certain secured keyboards may prepare, in advance, modified secured keyboards. The modified secured keyboards may be from the same type of the installed secured keyboards, which have been modified to include a keylogger in front of the encryption mechanism. Then, the modified secured keyboards may be installed instead of the legal secured keyboard. Because a common secured keyboard does not have authentication capabilities, the switching of the keyboard will be transparent to the user as well as to the organization. In addition, an organization would like to have control on external devices such as, but not limited to, keyboards that are connected to user's computers that are connected to its private network.

Therefore, there is a need in the art for a method to secure the communication between an external device and its host. Exemplary external devices can be, but are not limited to, keyboards, printers, scanners, etc. An exemplary method may use a device that can be connected between an unsecured external device and its socket in a host computer and that operates to convert the unsecured device into a secure device or alternatively the device can be added as an inherent module of the external device.

Furthermore, there is a need in the art for a method and system for inspecting the continuity of the connection between an external device and the host. Such a technology is needed to identify whether the connection has been broken for a period of time and in response to identifying a penetration, take preventive actions to eliminate damages.

BRIEF SUMMARY OF THE INVENTION

Embodiments of the present invention meet the above-described needs in the art by providing a method and system for protecting the communication between an external device and a host computer. One exemplary embodiment provides a method and system for inspecting the pureness of a connection between an external device and a host computer. If a disconnection of an external device and its host computer has been identified, an indication can be sent to the host and, in parallel, the external device may be disconnected or otherwise disabled. An exemplary connection protector device (CPD) may be added to the connection between the external device and the host. The CPD can have two connectors or interfaces, one for the host and one for the cable of the external device. The CPD can be adapted to identify any disconnection or interruption in the connection with the host and/or the connection with the external device on the other side of the CPD.

Yet in alternate exemplary embodiment of the present invention, a host computer can be adapted to obfuscate the data transportation from an external device by manipulating existing features of the external device without using a CPD. For example, an embodiment of the present invention may utilize a configuration procedure of a keyboard to obfuscate the data transportation coming from the keyboard. A Common keyboard can be configured by a host to use a scan mode that matches the processor of the host. For example, in PS/2 a "Scan-Code" 1 is used when an XT computer is the host while "Scan-Code" 2 matches other type of computers. A host computer, in such an embodiment of the present invention, may alternate randomly or pseudo randomly between "Scan-Code" 1 and "Scan-Code" 2. In addition, a look up table (LUT) can be utilized in order to de-obfuscate the received data and to translate the received key strokes to the appropriate "Scan-Code" that matches the host.

In an alternate exemplary embodiment of the present invention, a connection protector device (CPD) may be an integrated part of the external device. The integrated CPD can be adapted to identify any disconnection in the connection with the host. In this application, the terms "inherent CPD", "integrated CPD" and "internal CPD" are used interchangeably.

Sensing the continuity of the connection can be done mechanically, by using an interlock switch mechanism at one or both of the connectors, for example. In an alternate exemplary embodiment of the present invention, sensing the continuity of the connection can be done electronically, using an internal power source (a battery, e.g.) or the power source of the host. Yet in alternate embodiment of the present invention, both techniques can be used, the mechanical and the electronic one.

When a temporary disconnection is detected, an exemplary integrated or external CPD may inform the host, when the connection is renewed, about the disconnection and wait to receive further instructions. In another embodiment of the present invention, in parallel to informing the host, the integrated or external CPD can block the communication between the external device and the host.

In one exemplary embodiment of the present invention, recovery from a disconnection session may require replacing of the external CPD and installing a new one. In an embodiment in which the CPD is an integrated part of the external device, then the entire external device has to be replaced. In an alternate embodiment of the present invention, a reset session can be performed electronically by an authorized person, such as an administrator of an organization, for example.

In addition to the integrated or external CPD, an exemplary embodiment of the present invention may require a software module, such as a device driver, to be installed in the host for communicating with and controlling the CPD. The device driver can be installed with or without an application program for communicating with a user In addition, the device driver can communicate with a security server if one exist in the particular implementation. As a further example, a software module related to the CPD can be installed and operate in a manner to serve as an interface between the relevant port driver and the device driver level.

When the integrated or external CPD is installed in association with a host that belongs to an organization, an exemplary embodiment of the present invention may be associated with a security server that is used by the organization. An exemplary security server is disclosed in international publication number WO 2005/054973, the content of which is incorporate herein by reference. In such a system the security server may be adapted to communicate with the application at the host that is associated with the CPD, to retrieve status information on the pureness of the relevant connection. Among other things, the server may include a revocation list. The revocation list may include information or identifications of CPDs that are suspected to be infected, have previously been rejected or have been reported as lost. A copy of the revocation list can periodically be sent to the plurality of hosts that are connected to security server.

In alternate exemplary embodiment of the present invention, the integrated or external CPD and the host are adapted to encrypt/decrypt the transportation between them. The encryption algorithm can be a common encrypting and authenticating algorithm including but not limited to Secure Socket Layer (SSL), for example. Other exemplary embodiments of the present invention may use two separate algorithms, one for authentication and one for encryption. For example, an RSA algorithm or Diffie Hellman algorithm can be used for authentication while an AES, or DES, or Tipple DES algorithms can be used for symmetrical encryption. During installation of the CPD, the CPD and the host are configured using a certificate, which was signed by the security server, for example. The signed certificate includes a public/private key pair.

During power on or bootstrapping the external CPD is transparent to both ends, and thereby enables the host to communicate with the external device to set the connection with it. The CPD can be configured to operate as a hub, for example a USB hub for a USB external device. In a situation in which the external device uses other types of ports, for example PS/2 or Serial, the CPD can be configured as a shunt or a short circuit and thereby transfer the information as is.

In one exemplary embodiment of the present invention, at the end of the bootstrapping a key exchange session is initiated by the host. During the key exchange session, the integrated or external CPD sends its signed certificate to the host. This process is referred to as associating the CPD with the host and an exemplary embodiment involves the following steps:

(a) upon receiving the signed certificate and authenticating the CPD, the host responds by drawing a random number that is used as a sessional key, (b) the sessional key is encrypted using the public key—the public key is embedded in the signed certificate (It should be appreciated that other exemplary embodiments of the present invention may use other key exchange protocols for transferring the sessional key, such as but not limited to Diffie-Hellman for example), (c) upon receiving the encrypted sessional key, the CPD decrypts the sessional key using its private key (at this point it should be appreciated that both ends of the connection are using the sessional key to encrypt/decrypt the communication between the CPD and the host) (the encryption/decryption of the communication between the CPD and the host can be based on a symmetrical algorithm such as, but not limited to, AES, DES, etc.)

(d) from time to time the sessional key can be replaced by using this same or a similar authentication method.

In an alternate exemplary embodiment of the present invention an SSL protocol can be used for authenticating the external device and for encrypting the communication between the external device and the host.

Furthermore, the host is adapted to check that the integrated or external CPD is alive and operating properly and has not sent any indication on disconnection. If any of those three parameters fails the host may ignore the external device, informs the user as well as the security server, if exist. In order the recover from this situation an intervention of an administrator may be needed.

In an alternate exemplary embodiment of the present invention, a mechanical securing mechanism can be used to secure the connection of the external CPD and the cable of the external device. Using the mechanical securing mechanism, the external device and the external CPD are converted into one secured device that delivers authentication and encryption. In one embodiment of the present invention the mechanical securing mechanism can be a lock with a key. In another embodiment the mechanical securing mechanism can be a permanent lock, such as but not limited to a pin, a spring, glue, etc.

Other objects, features, and advantages of the present invention will become apparent upon reading the following detailed description of the embodiments with the accompanying drawings and appended claims.

DETAILED DESCRIPTION OF THE INVENTION

Turning now to the figures in which like numerals represent like elements throughout the several views, exemplary embodiments, aspects and features of the present invention are described. For convenience, only some elements of the same group may be labeled with numerals. The purpose of the drawings is to describe exemplary embodiments of the present invention and not for production or limitation. Therefore, features shown in the figures are chosen for convenience and clarity of presentation only. Dimensions of components and features shown in the figures are chosen for convenience and clarity of presentation and are not necessarily shown to scale.

Figure 1:
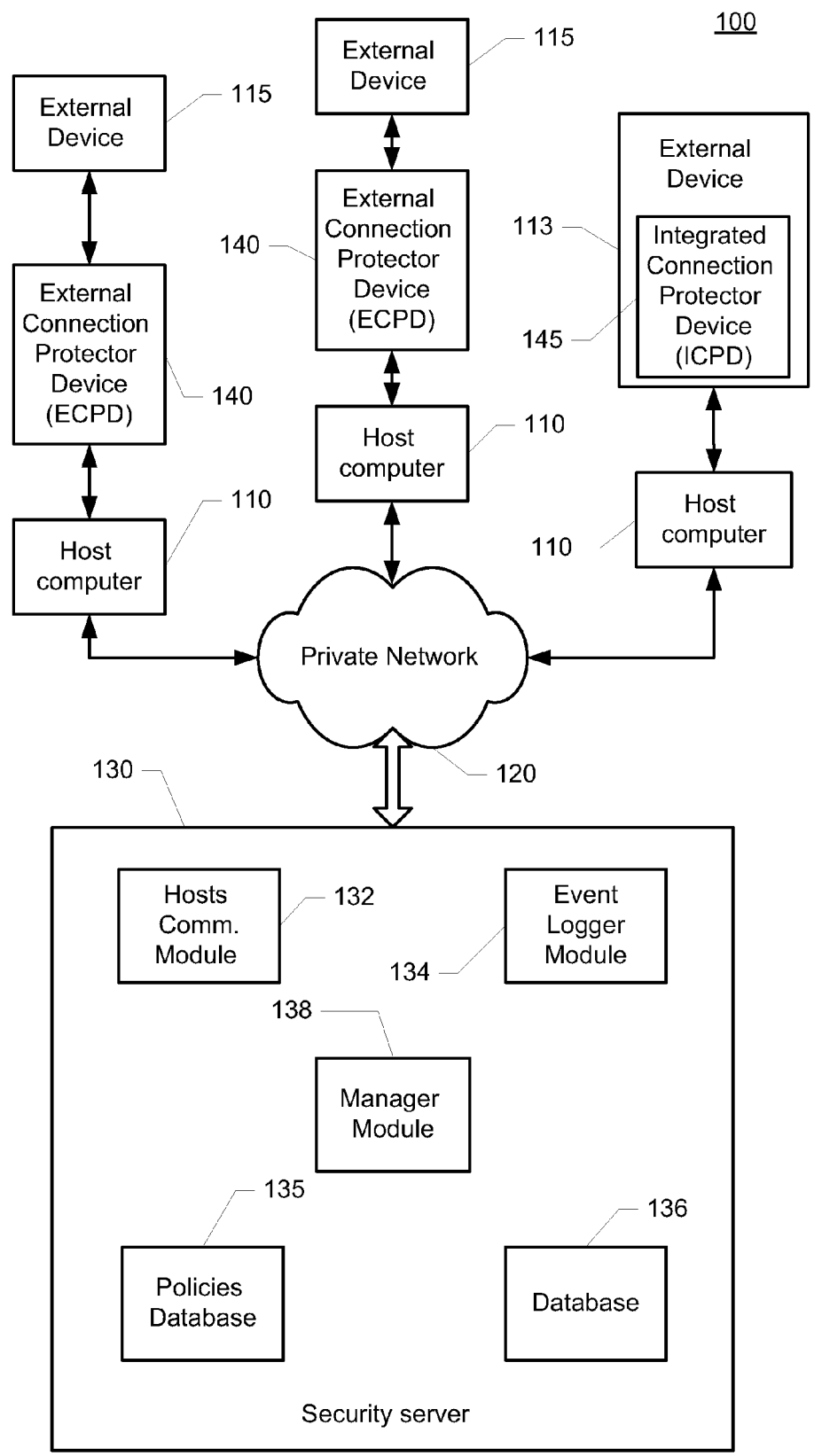
FIG. 1 is a simplified block diagram with relevant elements of a computer system that uses an exemplary embodiment of the present invention.

FIG. 1 is a simplified block diagram with relevant elements of a computer system that uses an exemplary embodiment of the present invention. The illustrated embodiment operates to protect the connections between host computers 110 and external devices 115 and 113. The computer system 100 can comprise a plurality of host computers 110, a private network 120, and security server 130. Each host 110 is connected to at least one external device 115 or 113 via an external connection protector device (ECPD) 140 or an internal connection protector device (ICPD) 145 (respectively). Three instances of host computers 110, two of external devices 115 and ECPDs 140 and one external device 113 with an internal connection protector device (ICPD) 145 are shown in FIG. 1 by way of example only, and it will be appreciated that any number thereof those modules may also be used with the present invention. The private network 120 may be an Intranet, Intranet, a LAN, a VPN (Virtual Private Network), or any other type of communication network. During the following paragraphs of the detailed description the term CPD may refer to both external CPD (ECPD) and internal CPD (ICPD).

Each of the host computers 110 may be a personal computer, a workstation, a desktop computer, mainframe computer, blade server (e.g. CITRIX), dumb terminal, etc. or any other type of computing device that can be connected to an external device 115 or 113. Each of the host computers 110 may also be a portable device, such as but not limited to a laptop computer, notebook computer, a smart phone, a personal digital assistant (PDA), or any other type of mobile device.

External device 115 and/or 113 can be a common keyboard, a printer, an external disk, etc. that is connected via a cable or directly to a connector (port) in the host. The connector can be, but is not limited to, USB, PS/2, FireWire or Serial. A common external device 115 is an un-secured device, which means that the transportation between the external device 115 and the host 110 is not encrypted and the host cannot authenticate the external device. ECPD 140 is added and is installed in between the external device 115 and the host 110 to convert the un-secured common external device 115 to a secured one. External device 113 has an ICPD 145 as an inherent part of the external device 113. Therefore the communication between external device 113 and its host 110 is secured and the host 110 can authenticate the external device 113 as the authorized one.

Exemplary ECPD 140 can have two connectors—one for the connection with the host 110 and one for the connection with the external device 115. An exemplary ECPD 140 can have a mechanical securing mechanism that secures the connection with the cable of the external device combining the common external device 115 with the ECPD 140 to one secured device. The mechanical securing mechanism can be a permanent one, irreversible, or a temporary one having a lock and a key. More information on such an exemplary mechanical securing mechanism is described below in conjunction with FIG. 2A.

An alternate exemplary embodiment of an ECPD 140 can have an electrical mechanism that is adapted to sense any disconnection in the connection with the external device 115 and/or with the host 110 on the other side of the ECPD. Upon determining that a disconnection has been sensed the internal communication between the two connectors of the ECPD 140 can be stopped. In another embodiment, in which an ICPD 145 is used, the ICPD 145 can be adapted to sense any discontinuity in the connection between its external device 113 and the host 110. More information about the host computers 110 and the ECPDs 140 or ICPD 145 is disclosed below in conjunction with FIGS. 2B, 3, 4, 5A, 5B, and 6.

The security server 130 may be an element of network 120. The security server 130 may be responsible for managing the security policies that are used over the private network 120. A plurality of policies may be used by each host computer 110. The security policies may be based on the host's degree of security, the environment that the host is working in, the type of the devices that are connected to the host computer, etc. The security policies can be updated from time to time and then be loaded or reloaded into the hosts. Furthermore, the security server 130 can be used for configuring the CPDs 140 and/or 145 and providing a signed certificate to the CPD 140 and/or 145 prior to being connected. The signed certificate is used for authenticating the CPD 140 and/or 145.

The security server 130 can operate to ensure that all host computers 110 comply with specified security policies. For example, if a disconnection between an ECPD 140 and its associated external device 115 has been sensed, or a disconnection between an external device 113 having an ICPD 145 and its associated host 110 has been sensed, an indication may be sent to the security server 130. In response to such an indication, the access of the host computer 110 to the corporate network 120 can be prevented and an indication or notice may be sent to an administrator of the network, etc. The security server 130 may periodically update the security policies that are installed in each one of the host computers 110. A security agent may be installed within the host computer 110 and, among other things, operates to enforce the security policy by monitoring events in accordance with the security policy. Furthermore, the security agent is used to communicate with the CPD 140 and/or 145.

The security server 130 can be constructed in a variety of manners. In one embodiment, the security server 130 may comprise the following relevant modules: host communication module 132, event logger module 134, policies database 135, database 136, and a manager module 138. Host communication module 132 is typically used to communicate with the plurality of host computers 110 over private network 120 while the host computers 110 are connected to the private network 120. The communication between the host computers 110 and the security server 130 can be encrypted to create a secure connection between the host computers 110 and the security server 130, over which data can be sent securely.

The communication from the security server 130 to the host computer 110 may include: (a) the provision of updated security policies and/or periodically checking whether the installed security agent and the installed security policies have been contaminated or have been tampered with by any hostile entity, (b) checking whether a disconnection was sensed between a ECPD 140 and its associated external device 115, or (c) checking whether a disconnection was sensed between the external device 113 having the ICPD 145 and its associated host 110, etc. If a particular host computer does not have a required host security agent or security policy installed, or the security agent was infected, or a disconnection was sensed, the security server 130 can prevent further access to the corporate network until such host computer has installed and activated the required security agent or security policy.

The communication from the host computer 110 to the security server 130 may include: a real-time indication that is used to inform the security server 130 when the host computer 110 is connected to the private network 120, reports on events according to the security policy, reports on trials to affect the security agent, the connection between an ECPD 140 and its associated external device 115 or between the external device 113 having the ICPD 145 and its associated host 110, or the stored security policy, etc. The report may include information on any disconnection between the host computer 110 and the external device, information on the data transfer, the timing of the event, etc.

The event logger 134 may be a storage volume that can be used to store the reports that have been sent from the users within a certain period and/or any policy violation event. The reports may be retrieved and processed manually by an administrator of the private network 120 or automatically by the manager module 138, which may run several statistical algorithms to monitor the security of the network.

Policy database 135 is a database that includes a plurality of policies, including security policies, which may be used by the organization that owns the private networks 120. A security policy may include a set of rules that are used to determine whether a given host computer can be permitted to gain access to a specific device. The security policy may depend on various factors, including but not limited to, the location of the host, the external devices, the type of applications, etc. The security policy may define how to respond to an indication that a disconnection between an ECPD 140 and its associated external device 115 has been sensed, or between the external device 113 having the ICPD 145 and its associated host 110, how often to change a sessional key, etc.

Database 136 is a database that may include information regarding the various host computers 110 that may be connected over private network 120, the different CPDs 140 or 145, etc. This information may include items such as, but not limited to: host level of security, the type of equipment that the host possesses, the external devices to which the host computer is allowed to be connected, configuration of the security agent that is installed in the host, information about the one or more CPDs 140 or 145 that are connected, information on the different CPDs 140 or 145 that have been configured by the security server 130 but are not installed yet, etc.

Manager module (MM) 138 manages the operation of the security server 130. The manager module 138 may initiate tasks to check the situation of the security agents and the security policies, which are installed in the host computers. The MM 138 may create and send the appropriate policies to each one of the host computers 110. Based on the information that is stored in the policy database 135 and the database 136, the MM 138 may create one or more policies for a particular host. The MM 138 may run Artificial Intelligence algorithms over the information that is stored in the event logger 134 and may send indications and conclusions to the administrator of the network. The MM 138 may make decisions regarding certain activities of a host computer 110 and affect his connection to the private network 120 based on such decisions During configuration of a new CPD 140 or 145 the MM 138 may support the configuration process in which a signed certificate is assigned to the new CPD. The signed certificate can comprise a public/private key pair. The private key can be drawn by the MM 138. At the end of the configuration stage, information on the new CPD 140 or 145 and its associated signed certificate is stored in the database 136. This information can be retrieved when the relevant CPD 140 or 145 is installed.

FIG. 2A illustrates a cross section view along a cut in a receptacle connector of an exemplary ECPD 2200 that is using a mechanical securing mechanism versus a common device 2100 having a common receptacle connector. The exemplary hardware devices 2100 and 2200 are USB devices, however the present invention is not limited to being incorporated into USB devices. Devices having other types of connectors can be protected by other exemplary embodiments of the present invention. The exemplary connectors that are illustrated in FIG. 2A are USB receptacle series 'A'. Electrically, Series "A" receptacles function as outputs from host computers and/or hubs. Series "A" receptacle mates with a Series "A" plug (male).

FIG. 2A illustrates the section of the hardware device 2100 or 2200 to which the cable (not shown) of an external device 115 (FIG. 1) can be connected. A common USB receptacle 2105 comprises an external envelope (shell) 2120a-b, an internal body 2110 for caring the contacts and bi-directional holding springs 2130 and 2140. The bi-directional holding springs 2130 and 2140 are used to hold a mated plug, which is located at the end of a cable of an external device, while the external device 115 (FIG. 1) is connected to a host 110 (FIG. 1).

A common bi-directional holding spring 2130, 2140 has two bars 2130a&b and 2140a&b, respectively. Bars 2130b and 2140b slip over the plug during the connection of the external device and enable pushing the plug into the receptacle 2105. When disconnecting the external device 115 (FIG. 2), bars 2130b and 2140b are passive. Bars 2130a and 2140a slip over the plug being disconnected from the external device and enable pulling the plug from the receptacle 2105. While connecting the external device to the host, bars 2130a and 2140a are passive. When the plug and the receptacle 2105 are mated, the junction of bar 2130a with bar 2130b and the junction of bar 2140a with 2140b penetrate an appropriate hole in the shell of the plug holding the plug in mated position. More information about USB connectors can be found in Universal Serial Bus Specification Revision 2.0 Apr. 27, 2000, the content of which is incorporate herein by reference.

An exemplary embodiment of the present invention may replace one or more of the be-directional holding springs with a permanent, irreversible, mechanical securing mechanism (a locking mechanism). An exemplary locking mechanism enables a receptacle 2205 to be mated with or receive a plug but prevents the extraction or removal or other disconnecting of the receptacle 2205 and plug. An exemplary ECPD 2200 comprises an external envelope (shell) 2220a&b, an internal body 2210, a locking spring 2230 and a bi-directional holding spring 2240. The shell 2220a&b and the bi-directional holding spring 2240 can be similar members as shell 2120a&b and holding spring 2140, respectively, which are described above. Internal body 2210 performs similar functionality of internal body 2110 which is described above with an additional feature, a niche 2215 for hosting the locking spring 2230.

Locking spring 2230 can have two bars 2230a&b. Bar 2230a is used as a spring for holding bar 2130b in position. While connecting the external device by inserting a plug into receptacle 2205, bar 2230b enables, or does not prevent, the plug to be pushed into the receptacle 2205 by slipping over the plug. When the plug and the receptacle 2205 are mated, bar 2230b penetrates an appropriate hole or indention in the shell of the plug and enters niche 2215 preventing the plug from being extracted. In another exemplary embodiment of the present invention, the holding springs and/or the locking spring, can be made of a single bar that is bent or formed to create the shape of the two bars of the springs. Other embodiments of the present invention may use a cylindrical spring and a pin instead of locking spring 2230a&b. The present invention is not limited to the shape of the locking mechanism. In an alternate exemplary embodiment of the present invention, a locking mechanism with a key can be used.

FIG. 2B is a simplified block diagram with relevant elements of an exemplary Connection Protector Device (CPD). The ECPD 200 can comprise: an external device connection checker (EDCC) 210, an external device interface module (EDIFM) 220, a connection manipulator module (COMM) 230, a host interface module (HIFM) 240, host connection checker (HCC) 250, a CPD manager module (CPDMM) 260, a memory 270, a CPD encryption/decryption engine (CPDEDE) 235 and an energy source 280, such as but not limited to a chargeable or non-chargeable battery. In the situation in which the ECPD 200 is adapted to protect a connector (port) that delivers a supply voltage (Vbus, for example), such as but not limited to a USB port, the energy source 280 can be used when the host is off or disconnected. In exemplary embodiments of the ECPD 200 that are used to protect a connector that does not deliver supply voltage, the energy source is the only power source of the ECPD 200.

An exemplary ICPD 145 (FIG. 1) that is embedded as an integrated part of the external device 113 (FIG. 1) may comprise modules similar to the connection manipulator module (COMM) 230, the host interface module (HIFM) 240, the host connection checker (HCC) 250, the CPD manager module (CPDMM) 260, the memory 270, the CPD encryption/decryption engine (CPDEDE) 235 and an energy source 280, such as but not limited to a chargeable or non-chargeable battery. The energy source is needed when a common external device does not have one. Because the ICPD is an inherent and internal part of the external device 113 there is no need for EDCC 210 or EDIFM 220.

EDCC 210 is adapted to sense a disconnection between an external device and an associated ECPD 200. Upon sensing a disconnection, an indication can be sent to the CPDMM 260. The CPDMM 260 may proceed in different ways; it may block the connection with the external device, for example. In an alternate embodiment of the present invention, the CPDMM 260 may send an indication to the host and let the host determine how to proceed. The decision may depend on one of the security policies that fit the current situation. For example, the host may allow certain types of communication to transfer between the external device and the host, and block other types of communication, etc.

Different types of EDCC 210 can be used by exemplary embodiments of the present invention. Some of the EDCC 210 can use mechanical mechanisms, others can be electrical modules and there are embodiments of the present invention that may use a combination of mechanical and electrical mechanism. Exemplary embodiments of the present invention in which an irreversible mechanical securing mechanism is used, such as but not limited to the one that is disclosed above, EDCC 210 may not be needed and can be eliminated.

An exemplary purely electrical module embodiment of an EDCC 210 utilizes the fact that the common connection between a host computer and an external device requires terminations at both end of the connection. The exemplary EDCC 210 can be adapted to sense the existence of the termination at the external device. For example, when the ECPD 200 is used to protect a USB connection, exemplary EDCC 210 can implement q similar sensing method that is used by a host computer for determining whether a USB device has been disconnected (i.e., by sensing the differential voltage). In the absence of the far end terminations, the differential voltage will nominally double as compared to when an external device is presented.

In an alternate embodiment, the EDCC 210 may be configured or enabled to periodically or a periodically send a keep-alive signal to the external device. An exemplary EDCC 210 can create and send a standard question or prompt to the external device and wait for a response. For example, in an embodiment of the present invention in which a USB keyboard is protected, the EDCC 210 can send a request for the status of the keyboard as a keep-alive signal.

An alternate embodiment of the present invention may add a non-standard contact (i.e., a sensing contact) in the receptacle of the ECPD 200. The sensing contact can be located in between the internal body and the external envelop (shell) of the receptacle. The sensing contact is connected as an input to the EDCC 210. When the ECPD 200 is not connected to an external device, the sensing contact is open. When the external device and the ECPD 200 are connected, the receptacle and the plug are mated and the shell of the plug is attached to the sensing contact providing a GND voltage, via the shield of the plug. The GND is sensed by the EDCC 200 indicating that the ECPD 200 is connected to the external device.

The EDIFM 220 comprises hardware and software elements that are needed to interface with the external device. The implementation of the EDIFM 220 depends on the type of connection (port) that is used between external device 115 and host 110 (FIG. 1). When the ECPD 200 is adapted to be connected to a USB port, the EDIFM 220 can be implemented as a USB Host based on the USB specification.

In operation, the output of the EDIFM 220 is transferred to the COMM 230. The COMM 230 manipulates the communication between the external device 115 (FIG. 1) and its associated host 110 (FIG. 1). Different types of manipulations may be implemented. In one exemplary embodiment of the ECPD 200, upon sensing a disconnection between the external device and the ECPD 200, the COMM 230 irreversibly breaks the connection between the EDIFM 220 and the HIFM 240. In such an embodiment, the COMM 230 can be implemented by a normally open latch. The latch is closed as long as the external device is connected to the CPD. However, upon sensing the first disconnection between the external device and the ECPD 200, the latch opens and remains open forever, breaking the connection between the external device and the host.

In an alternate exemplary embodiment of the present invention, the COMM 230 can include a router that internally routes the transportation between the internal modules of the ECPD 200. During bootstrapping of the host, downstream communication coming from the host via the HIFM 240 to the external device is routed to the EDIFM 220; and upstream communication coming from the external device via the EDIFM 220 to the host is routed to HIFM 240. During normal operation (after the bootstrapping of the host) downstream communication coming from the host via the HIFM 240 to the external device are routed to the CPDEDE 235 to be decrypted, and after decryption, the decrypted communication is transferred to the EDIFM 220 to be transferred to the external device; and upstream communication coming from the external device via the EDIFM 220 to the host are routed to CPDEDE 235 to be encrypted, and after encryption, the encrypted communication is transferred to the HIFM 240.

Communication passing the security agent installed in the host to the CPDMM 260 is first received by the HIFM 240 and is then routed by COMM 230 to CPDMM 260 and vice-versa. However, in an alternate exemplary embodiment, the COMM 230 can include the functionality of an internal router and the functionality of an irreversible normally open latch.

An exemplary COMM, which is embedded within an exemplary ICPD 145 (FIG. 1), may have functionality that is similar to that of the COMM 230 embedded within the ECPD 200 with a few modifications. For instance, in an ICPD, the communication between the internal modules of the external device 113 (FIG. 1) and its host 110 (FIG. 1) is manipulated by the COMM. Therefore, in the upstream direction, the COMM of an ICPD gets the information from the internal modules of external device 113. In the downstream direction the information is received from HIFM 240 as in ECPD. Furthermore, the COMM of an ICPD can be modified to respond only to disconnections with the host.

The HIFM 240 comprises hardware and software elements that are needed to interface with the host. The implementation of the HIFM 240 depends on the type of connection (port) that is used between external device 115 and/or 113 and host 110 (FIG. 1). When the ECPD or the ICPD is adapted to be connected to a USB port, the HIFM 240 can be implemented as a USB Hub based on the USB specification.

The HCC 250 operates to sense a disconnection between the host and the ECPD 200 or between the external device 113 (FIG. 1) and its host 110. Upon sensing a disconnection, an indication can be sent to the CPDMM 260. The CPDMM 260 may respond to the disconnection indication in different ways. For example, the CPDMM 260 may block the connection with the external device. In an alternate embodiment of the present invention, when the CPD is reconnected to the host, the CPDMM 260 may send an indication signal to the host and let the host determine how to proceed. The response of the host upon receiving the signal may depend on the particulars of the security policy that fits the current situation. For example, the host may allow certain types of communication to be transferred between the external device and the host, and block other type of communication, etc. However, the HCC 250 is less mandatory than the EDCC 210 when the communication between the ECPD 200 and/or external device 113 (FIG. 1) and the host is secured (encrypted), therefore in such exemplary embodiments of the present invention the HCC 250 is not necessary and thus, is eliminated.

Different types of HCCs 250 can be used by exemplary embodiments of the present invention. Some of the HCCs 250 can use a mechanical mechanism, others can be electrical modules, and still other embodiments of the present invention may use a combination of mechanical and electrical mechanisms. The HCC 250 can be implemented by one or more of the methods that are described above in conjunction with EDCC 210.

The CPDEDE 235 is an encryption/decryption engine that is adapted to encrypt the upstream communication coming from the external device via COMM 230 toward the host 110 and to decrypt the downstream information coming from the host via COMM 230 toward the external device. In addition CPDEDE 235 can include authentication functionality. The CPDEDE 235 can use a common encrypting and authenticating algorithm including, but not limited to, a Secure Socket Layer (SSL), for example. Other exemplary embodiments of the present invention may use two separate algorithms, one for authentication and one for encryption. For example, an RSA algorithm or Diffie Hellman algorithm can be used for authentication while an AES, or DES, or Triple DES algorithms can be used for encryption. The authentication and the encryption/decryption process can be based on the signed certificate that was delivered from the security server and was transferred to the ECPD 200 or an external device having an ICPD via the security agent during the configuration stage while the first connection to the host was done. The signed certificate can include a public/private key pair.

Furthermore, there are situations in which the ECPDs or ICPDs may need additional adaptations to operate in association with some types of external devices. For example, an ECPD or ICPD, which is adapted to be associated with a keyboard as the external device, may be adapted to create encrypted data that matches common output data of a keyboard so that it can be received and processed by a common PC keyboard controller such as the INTEL 8042 microcontroller that is located at the host. For instance, the controller may reside on the communication path before the decryption module in the host computer. Furthermore, the controller may be configured to only accept a specific domain of values as valid data. During the encryption process, the domain of potential outputs may be different than the domain of valid data values. Therefore a CPDEDE 235 that belongs to a CPD that is associated with a keyboard may include a keyboard adaptation module at the output of the encryption/decryption engine to convert the encrypted output data into a format that will be accepted and passed through the controller.

An exemplary keyboard adaptation module may be adapted to receive the encrypted output, check whether the received output is compliant with a keyboard standard and whether the encrypted combination is a legal output of a keyboard. If the output is compliant and a legal output, the encrypted data is transferred as is toward the host. If the output is not compliant or legal, the illegal block of data can be converted into two legal blocks of data, the first block can be used as an indication to the keyboard adaptation module at the host.

For example, an embodiment may define the symbol * as the indication for an illegal encrypted block of data. Furthermore, a lookup table (LUT) can be used that include all possible illegal encrypted blocks and their assigned replacement of two legal blocks. The first one is always the indicator, such as *, and the second represents the illegal block. The symbol *, although it is a legal combination is also replaced by two blocks. The symbol * can be the first entry in the LUT and it will be converted into two blocks, the first will be * and the second can be 0, for example.

In addition, to transfer keystrokes as fast as possible while keeping the quality of the encryption, an exemplary embodiment of the present invention may use a stream cipher encrypting method such as RC4 to transfer one keystroke at the time. In stream cipher-encrypting methods, the size of the plain text is similar to the size of the cipher text. In an embodiment that uses block cipher-encrypting method, such as but not limited to AES, additional data has to be added to each keystroke to maintain compliance with the required size of the block.

At the end of the bootstrapping, a key exchange session is initiated by an Encryption/Decryption engine that is located at the security agent. During the key exchange session, the CPDEDE 235 sends its signed certificate to the security agent. If an SSL algorithm is used, the following process can be initiated. The security agent upon receiving the signed certificate and authenticating the CPD, can respond by drawing a random number that will be used as a sessional key, and then encrypting the sessional key using the public key. The public key is the embedded in the signed certificate. Upon receiving the encrypted sessional key, the CPDEDE 235 decrypts the sessional key using its private key and from this moment forward, both ends of the connection are using the sessional key to encrypt/decrypt the communication between the CPD and the security agent. From time to time, the sessional key can be replaced. Replacing the sessional key may be done by using a similar authentication method.

The CPDMM 260 is the control module of the ECPD 200 and it can be implemented, for example, by a microprocessor using a program that is stored in memory 270. Memory 270 can include a non-volatile section and volatile section. The CPDMM 260 is adapted to communicate with the security agent at the host, and with the security server. Before installing the ECPD 200 and connecting it to an external device, the ECPD 200 should be configured. The configuration of the ECPD 200 can be performed by an administrator of the network 120 (FIG. 1) via the security server 130 (FIG. 1). During the configuration, a signed certificate is granted to the CPD and the security software, including relevant one or more security policies, are loaded into the non-volatile section of memory 270. The CPDMM 260 controls the operation of the COMM 230 based on indications coming from the EDCC 210 and the HCC 250 (if one exists), commands received from the security agent, and the current situation or mode of operation of the host (a bootstrap session or a common operation). In addition, when the CPDMM 260 suspects that the connection with the security agent has become infected, it can override the instructions coming from the security agent.

A CPDMM utilized within or in conjunction with an exemplary ICPD may have similar functionality as described for the CPDMM 260. However, because the ICPD is internal part of the external device 113 (FIG. 1), it can be implemented by software modules that are executed by the processor within the external device 113 or by a processor that is dedicated to the functionality of the ICPD. Furthermore, before connecting the external device 113 (FIG. 1) to its associated host 110, the ICPD should be configured. The configuration of ICPD can be preformed by an administrator of the network 120 (FIG. 1) via the security server 130 (FIG. 1). During the configuration, a signed certificate is granted to the ICPD and the security software including relevant one or more security policies are loaded to the non-volatile section of memory 260.

More information on the operation of the ECPD and/or the ICPD and their internal modules is disclosed below in conjunction with FIG. 5A, FIG. 5B and FIG. 6.

Figure 3:
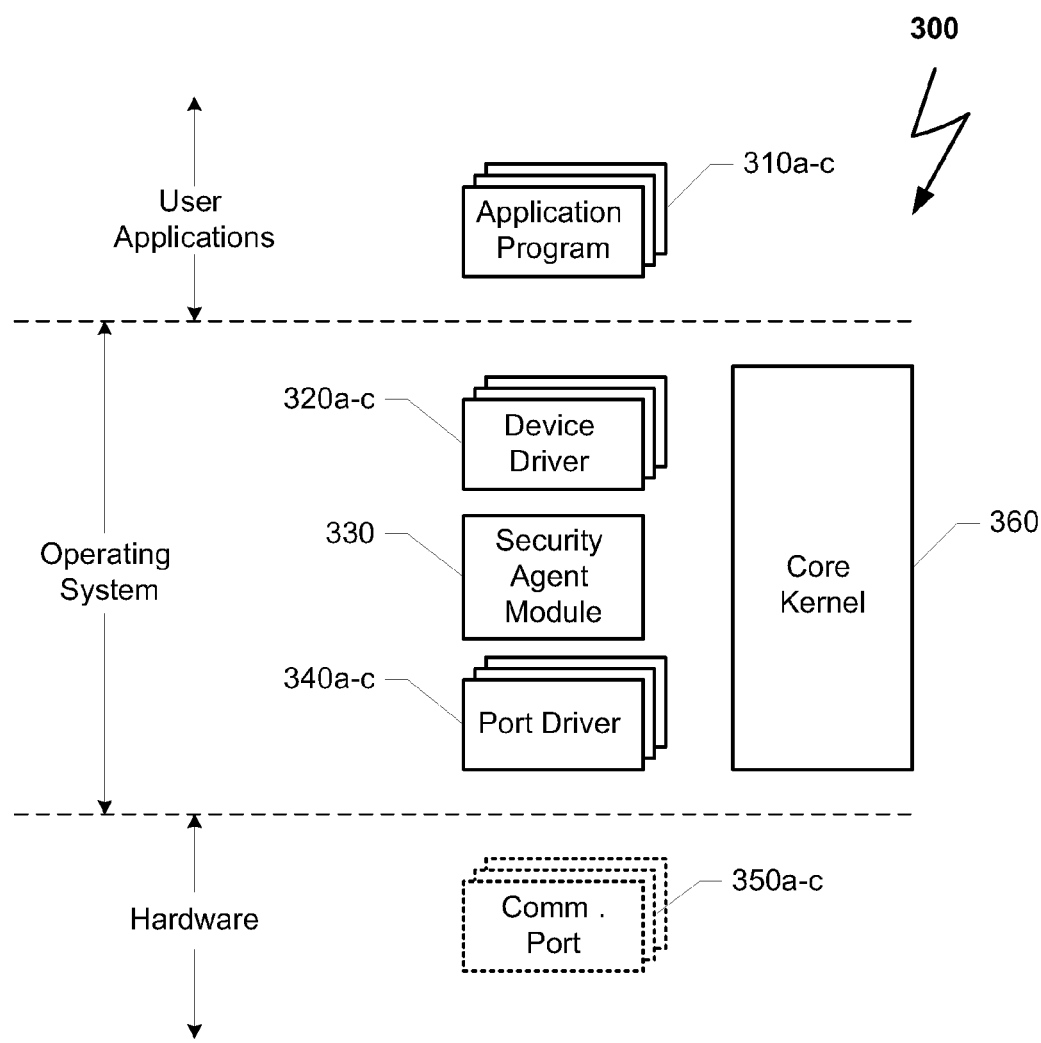
FIG. 3 is a simplified block diagram with relevant elements of an exemplary software installed in an exemplary host computer.

FIG. 3 is a block diagram with the relevant elements of a host system 300 that may be used in an exemplary host computer 110 (FIG. 1). The host system 300 may comprise one or more application programs 310a-c, one or more device drivers 320a-c, a security agent module 330, one or more physical communication ports or bus drivers (stack) 340a-c, a core kernel module 360 and one or more physical communication ports or buses 350a-c. Generally, the data transportation between a host computer and a device, in one direction flows in a path from an application 310a-c to a physical communication port 350a-c through the appropriate device driver 320a-c, security agent 330 and the appropriate port driver 340a-c. In the reverse direction the data transportation flows from a physical communication port 350a-c to an application 310a-c through the appropriate port driver 340a-c, the security agent 330 and the appropriate device driver 320a-c. The example illustrated in FIG. 3 shows the use of three application programs 310a-c, device drivers 320a-c, port drivers 340a-c and physical communication ports 350a-c; however, it will be appreciated that any number other than three may be used with the present invention and the choice of three is simply a non-limiting example. The host system 300, or aspects of the host system 300, may be stored in a fixed storage medium (e.g. a disc, flash memory, a read-only memory (ROM) etc.). During the operation of the host computer, one or more of the software modules may be retrieved from the fixed storage medium and may be loaded into a temporary memory such as a random-access memory (RAM).

The core kernel 360, the device drivers 320a-c and the port/buses drivers 340a-c may jointly be referred to as the operating system (OS) of the host computer 300 or 110 (FIG. 1). The OS may manage low-level aspects of the host computer operation, including managing the execution of processes, memory allocations, file input and output (I/O) and device I/O. An exemplary OS suitable for embodiments of the present invention may include Windows NT or XP, Unix, MAC OS, VMS; LINUX, SYMBIAN, PALMOS, etc. One or more application programs 310a-c may be transferred from a fixed storage medium into the RAM for execution by the host system 300. The application program 310a-c may be a program such as, but not limited to, word processing, Log On, Financial software, and communication applications such as, but not limited to, applications that utilize Bluetooth or WiFi protocols, Internet browser and Java applications for synchronization with external Java devices, such as but not limited to backup storage applications, etc.

When the core kernel 360 and/or one or more application programs 310a-c may want to communicate with an external device, the appropriate device driver 320a-c may be invoked. The device driver 320a-c is used as an intermediary between the core kernel 360 and/or one or more application programs 310a-c and the external device itself. Exemplary external devices can include: a keyboard, a removable storage device, a printer, a WiFi dongle, etc. Usually a device driver 320a-c is supplied by the vendor of the device itself. In addition to the device driver 320a-c, a port driver 340a-c may also be invoked. The port driver/bus driver 340a-c is used to organize the communication according to the protocol that is used over the physical communication port 350a-c. For example, if communication port 350 is a USB port, then a USB driver (USB stack) is needed. The above-described computer software is for illustrating the basic desktop and server computer components that may be employed by a host computer 310a-c (FIG. 1). In addition to those elements a security agent 330 is added by an exemplary embodiment of the present invention.

The security agent 330 may be installed in the standard storage of the host system 300 and it may be invoked during the power on cycle of the host computer 310a-c and remain active for the entire operation of the system. In other embodiments of the present invention, the security agent 330 may be burned onto a physical memory, such as the ROM, PROM, BIOS, etc. The security agent 330 may be installed as a section of the OS and can be handled by an administrator having the appropriate permissions. The security agent 330 may be installed in between the core kernel 360 and the one or more communication port/bus drivers 340a-c. Security agent 330 may act as a proxy for both sides. The security agent 330 may be transparent to the user (i.e., it may not have any icon or indication to inform its existence to the user).

The security agent 330 may emulate a kernel device driver and will receive the communication between the device driver 320a-c and the core kernel 360. During the installation and/or periodically, from time to time, the security agent 330 may register in the appropriate location in the core kernel as the first device driver for receiving the communication from/to the different physical communication port/bus drivers. For example, if the OS is a Microsoft product, than the security agent 330 may register in the registry as the first device driver to get the communication. The registration may be done in a class level or in a device level. Exemplary class levels for the registration may be USB, keyboard, FireWire, CD-ROM drivers, Disk Controller, etc. In some operating systems, the device driver may be constructed from a stack of two or more sub-device-drivers. In such architecture, the security agent 330 may collect information from at least one of the two or more sub-device-drivers. For example, in the scenario of using a USB keyboard device, such as but not limited to, a Dell USB keyboard in the WINDOWS environment, the stack of the relevant sub-device-drivers can include: usbhub, hidhub, kbdhid & kbdclass. The security agent may collect information from any of the four sub-device-drivers.

In an embodiment of the present invention the security agent 330 may emulate a filter procedure but, instead of providing the functionality of a common storage filter driver, the security agent performs security checking. A filter may perform device-specific functionality that is not provided by a class device driver. The security agent 330 may emulate more than one type of filter driver. The number of types of filters that may be emulated by the security agent 330 can be configured according to the number of physical communication ports and devices that the security agent 330 operates to check the transportation of and by the one or more ECPDs 140 and/or ICPDs 145 (FIG. 1) that are connected to the host.

The security agent 330 may be activated when an appropriate physical communication port is requested. The appropriate physical communication port is the one to which the ECPD 140 and/or ICPD 145 (FIG. 1) is connected. In an alternate exemplary embodiment of the present invention, the security agent can be invoked when a device driver 320 that is associated with the appropriate external device 115 or 113 (FIG. 1) requests an access to the external device. The security agent 330 may communicate with the appropriate ECPD 140 and/or ICPD 145 (FIG. 1), authenticate that the existing ECPD 140 and/or ICPD 145 (FIG. 1) is the appropriate one, if it is the appropriate one, (a) collecting status information from the ECPD 140 and/or ICPD 145 (FIG. 1), (b) processing the status information, and (c) determining whether the physical connection between the appropriate ECPD 200 and the requested external device 115 (FIG. 1) has been disconnected. In some embodiments of the present invention the connection between the ECPD 140 and/or ICPD 145 (FIG. 1) and the host 110 may also be checked.

If the ECPD 140 and/or ICPD 145 (FIG. 1) is the appropriate one and the connection has not been affected, one exemplary embodiment of the present invention, in which the connection between the ECPD 140 and/or ICPD 145 (FIG. 1) and the host is also checked, the security agent allows the communication to and from the external device without further processing. In an alternate embodiment of the present invention, in which a CPDEDE 235 (FIG. 2) is used, the security agent 330 may instruct the appropriate ECPD 140 and/or ICPD 145 (FIG. 1) to encrypt the communication toward the host. If the ECPD 140 and/or ICPD 145 (FIG. 1) is not the expected one and/or the connection between the ECPD and the external device, or in some embodiments of the present invention also the connection between the ECPD 140 and/or ICPD 145 (FIG. 1) and the host, has or have been affected, the security agent may respond by taking one of, or any combination of, the following actions: (a) blocking the transportation to and from the external device, (b) informing the user, and (c) informing the security server 130 (FIG. 1). Selecting the appropriate action or combination can depend on the embodiment of the present invention or may be defined by the security policy that is currently in use.

In order to recover from an alarm situation, one of, or a combination of, the following responses may be needed: (a) the user may be requested to check the connections, and by using a password to reset the security agent; (b) an administrator of the network is requested to check the connection and reset the security agent; (c) the ECPD 140 or external device 113 (FIG. 1) has to be replaced; (d) the ECPD 140 or external device 113 (FIG. 1) has to be reconfigured by the security server 130 (FIG. 1), etc. Selecting the appropriate action or the combination can depend on the embodiment of the ECPD or may be defined by the security policy that is currently in use.

From time to time security agent 330 may initiate a sessional key replacement session with the ECPD 140 or ICPD 145 (FIG. 1); may check the connection with the ECPD 140 or ICPD 145 (FIG. 1) and requests a status update; may request policy update with the security server, etc. More information about the operation of security agent 330 is disclosed below in conjunction with the description of FIGS. 4, 5A, 5B and 6.

In an embodiment of the present invention, in which the data transportation from an external device to a host is obfuscated by manipulating existing features of the external device, a security agent 330 can be adapted for manipulating those features. For the example of a keyboard as the external device, the security agent can alternate between "Scan-code" 1 and "Scan-code" 2. Alternating from one "Scan-code" to the other can be randomly or pseudo randomly. Each time, a "Scan-code" that does not match the type of the host is sent to the keyboard, the security agent module 330 can be adapted to route the received information toward an LUT for converting the unmatched key stroke data into the appropriate one that matches the host. Each entry in the LUT can match data coming from a keystroke in one "Scan-Code" while the data stored in each entry reflects the correct data that is supposed to be received in response to clicking the certain keystroke.

Another exemplary embodiment of the present invention (not shown in the drawings) may be used by a private user, who is not connected to a private network. The user may wish to protect his information from being known by others. In such an embodiment, the host system may comprise some additional modules, such as the modules disclosed above in conjunction with the description of the security server 130 (FIG. 1). The additional modules may perform the configuration stage of a new ECPD 140 or external device 113 (FIG. 1), for example.

Figure 4:
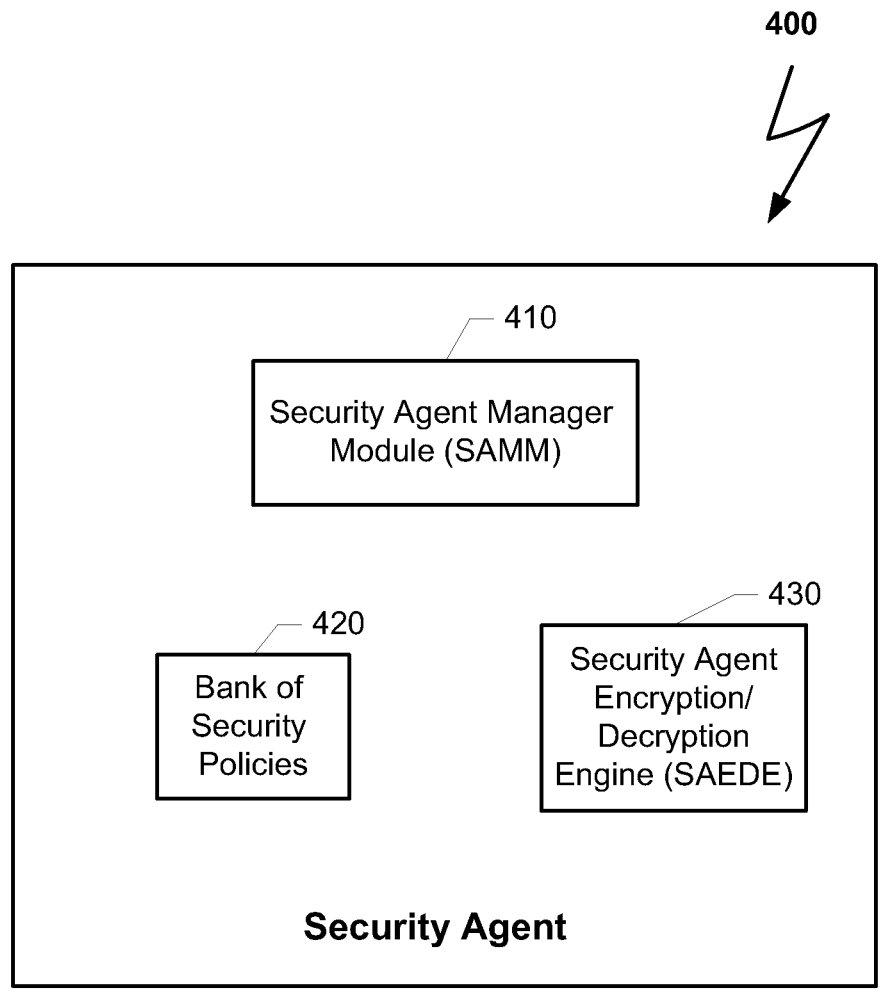
FIG. 4 is a simplify block diagram illustrating components of the host security agent according to an exemplary embodiment of the present invention.

FIG. 4 is a block diagram with the relevant elements of a software program 400 that may be used by an exemplary security agent 330 (FIG. 3). Software program 400 and its associated application (if needed) can be loaded by an administrator of the network 120 (FIG. 1) or a private user if the host is not connected to a network while installing the CPD (ECPD or an external device with an ICPD). Loading the software can be done from the security server 130 (FIG. 1) or from a CDROM, for example, that is associated with the new CPD.

The software program 400 may comprise a Security Agent Manager Module (SAMM) 410, a Bank of Security Policies 420 and a Security Agent Encryption/Decryption Engine (SAEDE) 430. The SAMM 410 may manage the operation of the security agent 400. During the installation of a CPD (ECPD or an external device with an ICPD), the SAMM 410 is responsible for communicating with the security sever 130 (FIG. 1), verifying that the CDP is valid, collecting the relevant one or more policies from the security server, loading an appropriate policy to the CPD, selecting a sessional key to be used for encrypting the communication between the CPD and the host, etc. In order to communicate with the security server and with the user (if needed), the SAMM 410 may use an appropriate application 310a-c (FIG. 3). During common operation the SAMM 410 collects status information from the CPD, checks the connection with the CPD, selects a sessional key and manages the other operations of the security agent 330 (FIG. 3).

The bank of security policies 420 can comprise one or more security policies that are loaded from time to time from the security server 130 (FIG. 1). A typical policy may include information such as, but not limited to: when to replace a sessional key; how often to collect status from the CPD; how to react to a disconnection indication between the CPD (for ECPD only) and its associate external device; how to react to a disconnection between the host and its associate CPD (ECPD or an external device with an ICPD); how to recover from an alarm situation, identify a revocation list of CPDs, etc. The stored policies can be adapted to the user, the host, the external device, the type of the CPD, etc. The SAMM 410 may select an appropriate policy when it is needed, may update the policy at the CPD and may update the current policies that are stored in bank of security policies 420 with an updated policy.

The SAEDE 430 acts as the authentication and encryption decryption engine of the host. It may perform the inverse functionality of the CPDEDE 235 (FIG. 2B). When the external device 113 or 115 is a keyboard, the SAEDE 430 may need additional adaptations to decode the conversion of the keyboard adaptation module that is used by the CPDEDE 235 as was depicted above. The decoder of the keyboard adaptation module can be installed in front of the SAEDE 430. The decoder may search the incoming blocks of data looking for the symbol *, for example, that is used for indicating a combination of two blocks that represent an illegal encrypted block of data. By using an inverse LUT to the LUT that is used by the keyboard adaptation module, the decoder converts the two blocks of data into the original illegal block. The illegal block is transferred to the decryption engine of SAEDE 430. More information about the operation of the software program 400 is disclosed below in conjunction with the description of FIGS. 5a&b and 6.

In an alternate exemplary embodiment of the present invention (not shown in the drawing) a CPD is not used. In such an embodiment, the security agent may include some of the functionality that is preformed by the CPD. In this embodiment, the security agent can comprise a software module for sensing the continuity of the connection with the external device. Different software modules can be used to implement this aspect of the invention. For example, if the security agent protects a USB connection, the security agent can be associated with the operating system and get a disconnection indication from the operating system of the host when the host determines that the USB external device has been disconnected. If the external device is not connected to a USB port, the security agent may send, from time to time, a keep alive signal to the external device and based on the response, can determine the continuity of the connection. An exemplary CPD can create and send a standard question to the external device and wait for a response. In an embodiment of the present invention in which a USB keyboard is protected, the CPD can send a request for the status of the keyboard as a keep-alive signal, for example. Yet in alternate embodiment of the present invention, although a CPD is used, the security agent may comprise a software module for sensing the continuity of the connection with the external device. A security agent can be capable of identifying a keyboard initialization code as an alert to a reconnection of a keyboard, for example.

Furthermore, the security agent may include a power off section that saves the indication received on the occurrence of these events: disconnection and/or power off. The indication may include the time when the event occurred. Upon determining a disconnection event, the security agent may block the communication to or from the relevant port driver and the device driver.

Figure 5A:
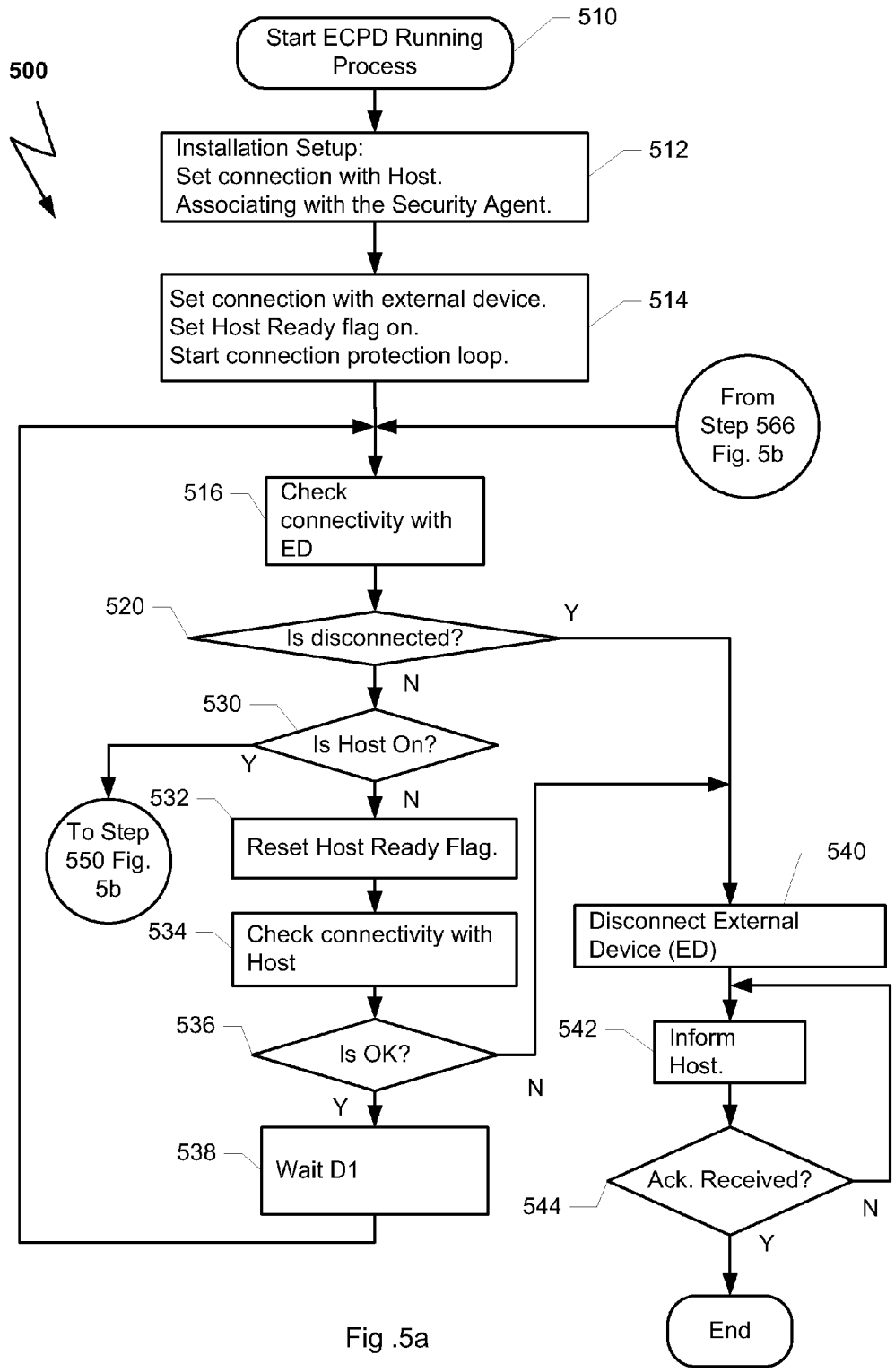
FIG. 5A and FIG. 5B illustrate a flowchart with relevant steps of an exemplary method for managing an exemplary CPD.
Figure 5B:
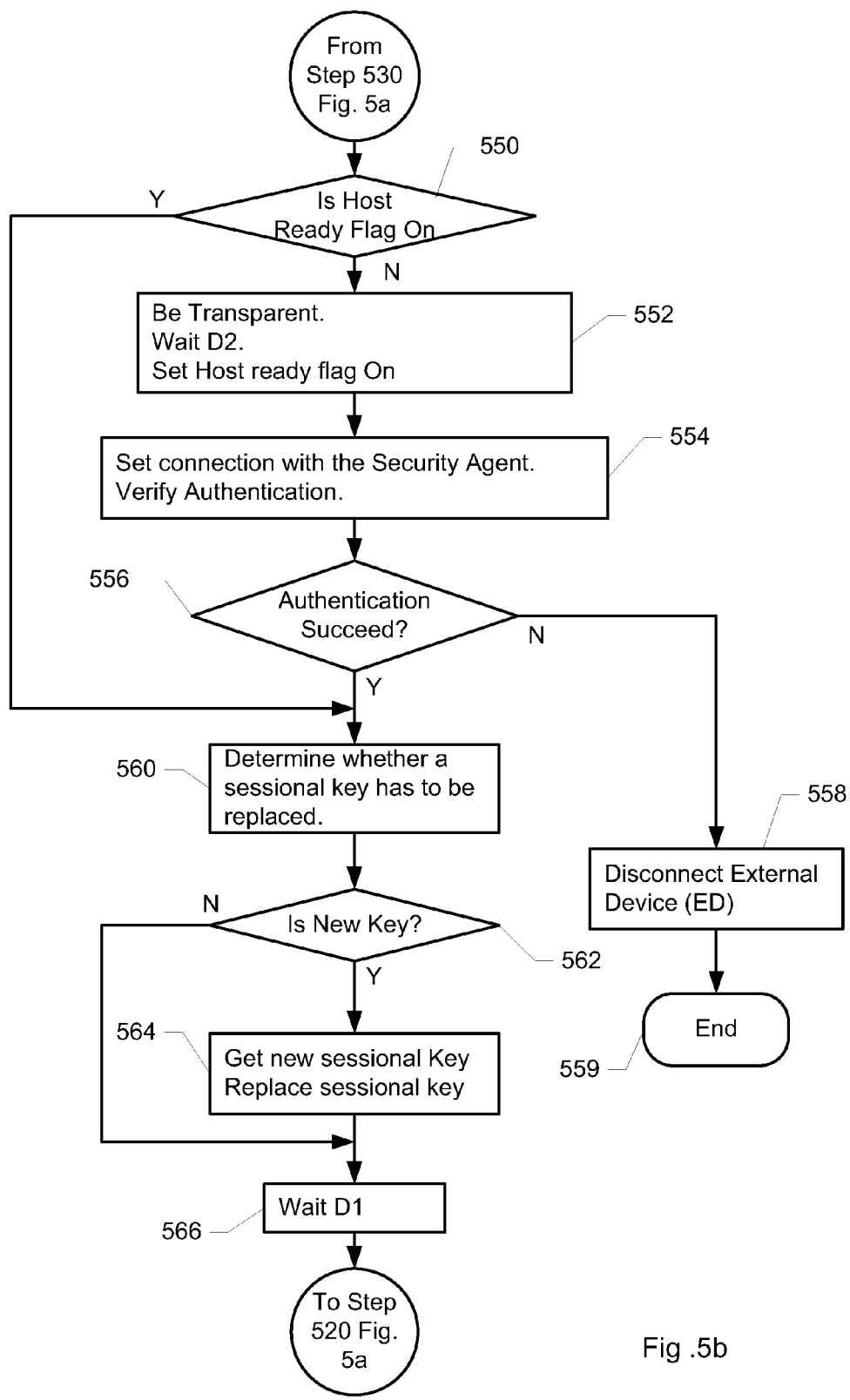

FIGS. 5A and 5B illustrate a flowchart depicting relevant steps of an exemplary method 500 for providing aspects of the present invention. The method 500 may be used by exemplary ECPD 140 (FIG. 1) to prevent eavesdropping of data communication over a connection between an external device 115 and its host computer 110. With few modifications, which are depicted below, the method 500 can be used also by an ICPD 145 (FIG. 1). The method 500 can be used by the ECPD 140 after the configuration stage. The configuration stage can be initiated by plugging the ECPD into an appropriate port at the security server (a USB port for an ECPD that is adapted to protect a USB device, for example) by an administrator of network 120 (FIG. 1). The configuration is typically performed before the installation of the ECPD 140 between the external device and its host. When using an external device 113 (FIG. 1) with an ICPD 145, the external device 113 has to be plugged into the security server for the configuration stage. During the configuration process, a signed certificate is assigned to the new CPD (ECPD or ICPD). The signed certificate can comprise a public/private key pair. The private key can be drawn randomly by the security server 130 (FIG. 1). At the end of the configuration stage, information on the new CPD and its associated signed certificate is stored in the database of the security server 130. This information can be retrieved when the relevant CPD (ECPD 140 or ICPD 145) is installed for controlling the communication between the host and the external device. At this point of time the CPD (ECPD 140 or ICPD 145) can be removed from the security server and is ready to be installed.

In an alternate exemplary embodiment of the present invention, the configuration can be performed remotely from the security server by an authorized person, such as but not limited to the administrator of network 120 (FIG. 1). The administrator can plug the relevant external device 113 or ECPD 145 (FIG. 1) into a computer that is connected to network 120, for example the administrator's computer, and communicate with the security server to configure the new external device 113 or ECPD 140.

In an alternate exemplary embodiment of the present invention, the configuration can be performed by using the administrator or the user via the host computer. The configuration can be performed by a software program that is delivered with the CPD (ECPD 140 or ICPD 145). A signed certificate has to be delivered in association with the software and the CPD. The software can be loaded into the host for the configuration stage. To start the configuration, the ECPD is plugged into the appropriate port (socket) at the host, without connecting the external device, or the external device 113 (FIG. 1) with the ICPD 145 is plugged for the first time to the host. Such a configuration method can be done when the host is not connected to network 120.

There are cases in which the security server 130 (or the host computer, for a private user) requires that an external device will be connected to the other side of the ECPD in order to enable the configuration of the ECPD. In such exemplary embodiment of the present invention, a dummy external device can be used for the configuration stage. The dummy external device may be delivered with the ECPD and may emulate the external device.

The method 500 may be initiated 510 during the installation of a configured ECPD 140 (FIG. 1) over the connection between the host and the external device or when connecting an external device 113 having a configured ICPD 145 (FIG. 1) to the host. The Installation can be performed by an authorized person, such as the administrator of network 120 (FIG. 1). At step 512 the ECPD (without the external device) or the external device 113 having the configured ICPD 145 (FIG. 1) is connected to the appropriate port (socket) at the host computer 110 (FIG. 1). The software of the security agent 330 (FIG. 3) can then be loaded into the host. Loading the security agent can be done from the security server 130 (FIG. 1) or from a storage media—a CDROM for example. Then the security agent sets a connection with the CPD (the ECPD or the ICPD) and an authentication process is initiated. During the authentication process, the security agent and/or the CPD can authenticate the person who controls the installation. If the person is compliant with the requirements, then the authentication stage between the CPD and the host is started.

During the authentication stage 512, a key exchange session is started and the CPD (ECPD 140 or ICPD 145) sends its signed certificate to the host 110 (FIG. 1). The host upon receiving the signed certificate and authenticating the CPD, can respond by (a) drawing a random number that is used as a sessional key, and (b) encrypting the sessional key using the public key. The public key is embedded in the signed certificate. Upon receiving the encrypted sessional key, the CPD decrypts the sessional key using its private key and from this moment forward, the CPD and the host utilize the sessional key to encrypt/decrypt the communication between them. At the end of the association stage 512, the CPD becomes transparent, (i.e., acts as a HUB) to allow the connection with the external device 115 or 113 (FIG. 1). For ECPDs only, an instruction to connect the external device to the receptacle of the ECPD is then displayed.

In an alternate embodiment of the present invention, the SSL protocol can be used for protecting the communication between the external device 113 or 115 and its associated host 110 (FIG. 1).

At step 514, the CPD (ECPD or ICPD) and the security agent, which are transparent, cooperate to allow free transportation between the external device and the host. The free transportation enables the connection to be established between the external device and the host. After setting the connection between the host and the external device, an instruction to the CPD (ECPD or ICPD) is sent to set the "Host ready flag" and to start the connection protection loop. An indication can be displayed, informing the user/administrator that the installation of the CPD is successfully terminated and that the connection between the external device and the host is protected. At this point, the transparent stage of the CPD is terminated. From this moment forward, the continuity of the connection with the external device is checked and transportation between the external device and the host will be encrypted in an exemplary embodiment of the present invention using an encryption/decryption engine in the CPD and the security agent.

At this point, an exemplary connection protection loop can be started 516. The loop can be managed by the CPDMM 260 (FIG. 2b), for example. The loop can run as long as the CPD (ECPD or ICPD) has power. At the beginning of the loop, the continuity of the connection with the external device is verified 516 (for the ECPD only). Verifying the continuity of the connection can be done by the checking the state of a disconnected indication that can be created by the EDCC 210 (FIG. 2), for example.

At step 520, a decision is made whether a disconnection between the ECPD and the external device is sensed. If a disconnection is not sensed, then the condition of the host is checked 530. If at step 520 a disconnection between the ECPD and the external device is sensed, the transportation to and from the external device is manipulated (for instance it may be blocked) 540. Different methods for manipulating the transportation are described above, including but not limited to blocking the transportation between the two connectors of the ECPD. An indication that the connection with the external device was disturbed is sent to the host 542 and the method 500 waits 544 for acknowledgement. Upon 544 receiving the acknowledgement, the method 500 terminates 544. If 544 acknowledgement is not received, the method 500 may run in a loop 542, 544, while blocking 540 the communication with the host. Restarting of the method 500 may require another reconfiguration stage to be entered. The security agent, upon receiving the message, may inform the user and/or the security server. When the method 500 is executed by an ICPD, steps 516 and 520 may be eliminated and the method 500 may proceed from step 514 directly to step 530.

Returning now to step 530, the host is checked. If the host is ON, then the method 500 proceeds to step 550 in FIG. 5B. If 530 the host is OFF, the "Host ready flag" is reset 532. Depending on the exemplary embodiment of the present invention, the method 500 can proceed to step 534 as is illustrated in FIG. 5A or directly to step 538 (this branch is not illustrated).

Figure 2:
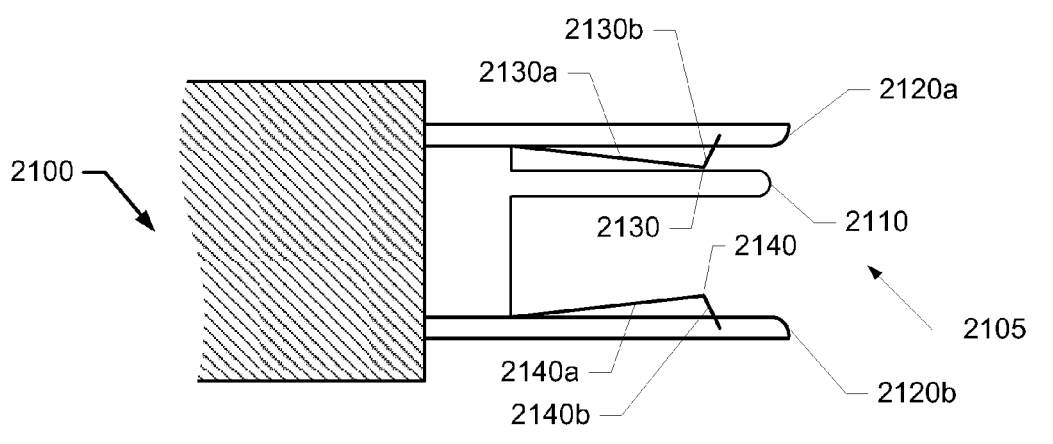
FIG. 2A illustrates a cross section view along a cut in a connector of a CPD that can be connected to an external device.
FIG. 2B is a simplified block diagram with relevant elements of an exemplary Connection Protector Device (CPD)
Figure 2:
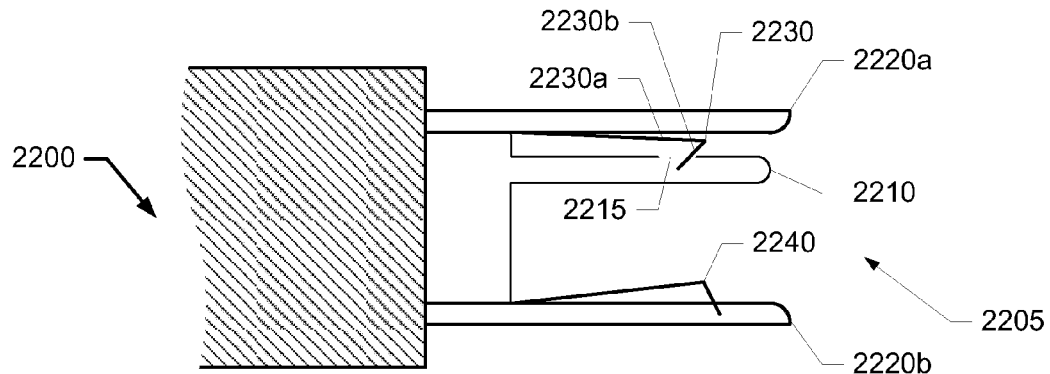
Figure 2:
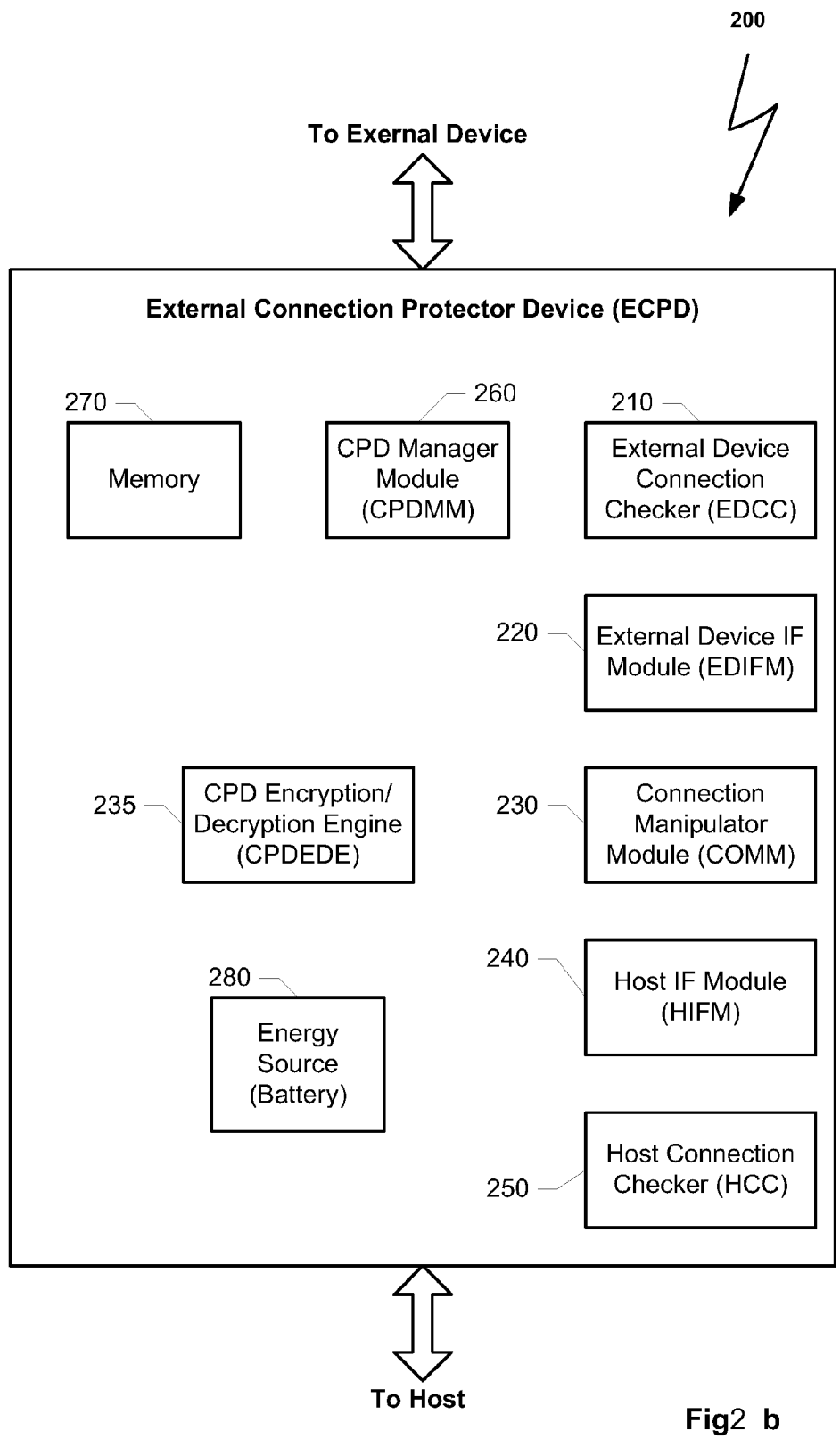

If an exemplary CPD (ECPD or ICPD) contains an HCC 250 (FIG. 2B) then the method 500 proceeds, according to the drawing, to step 534 and verifying the continuity of the connection with the host. Verifying the continuity of the connection can be done by checking the state of a disconnected indication that can be created by the HCC 250 (FIG. 2). If 536 a disconnection between the CPD and the host was sensed, the transportation to and from the external device is blocked (or otherwise manipulated) 540. If 536 a disconnection has not been sensed or the exemplary embodiment of the present invention does not contain an HCC 250, the method 500 waits 538 a period 'D1' and returns to the beginning of the loop to step 516. Period 'D1' can be in the range of few hundreds of milliseconds to few seconds.

Turning now to FIG. 5B, the steps of the method 500 that are performed when the host computer is ON (step 530 FIG. 5A) are illustrated in a flow chart format. A decision is made 550 whether the "Host ready flag" is ON (set). If the Host ready flag is ON or set, the method 500 proceeds to step 560. If 550 the 'Host ready flag' is OFF, then the CPD (ECPD or ICPD) becomes 552 transparent (like a hub, for example) for a period 'D2' allowing the host to communicate directly with the external device to set the connection with the external device. At the end of period 'D2', the "Host ready flag" is set by the CPD itself. Period 'D2' is configured to give sufficient time to the host computer to bootstrap and to set a connection with the external device. At the end of 'D2', the transparent stage of the CPD is terminated. From this moment forward, the continuity of the connection with the external device is checked (for an ECPD only) and transportation between the external device and the host can be manipulated by the CPD (ECPD or ICPD).

After setting the "Host ready flag" a connection is requested 554 with the security agent. The request for the connection can be sent from the CPD (ECPD or ICPD) to verify that the host was not affected and that the appropriate security agent was not removed. After setting the connection, an authentication is performed. If 556 the authentication or setting the connection have not succeeded, the transportation to and from the external device is blocked (or otherwise manipulated) 558 and the method 500 terminates 559. Restarting of the method 500 may require another reconfiguration stage to be entered. Different methods for manipulating the transportation are described above. If the authentication process succeeded 556, the encryption/decryption engine (if one exists) can be initiated and the method 500 proceeds to step 560.

At step 560 a decision is made 560 whether a sessional key has to be replaced. The decision can be based on different criteria. One exemplary embodiment of the present invention may use a time criteria and replace the sessional key after a certain period. Other exemplary embodiment of the present invention can replace the sessional key according to the usage of the external device, etc. Yet in another exemplary embodiment of the present invention, the security agent may determine whether to replace the sessional key and not the CPD (ECPD or ICPD). In such an embodiment of the present invention, steps 560, 562 and 564 may be preformed by the security agent and not by the CPD.

If 562 there is no need to replace the sessional key, the method 500 waits 566 for period 'D1' and returns to the beginning of the loop, to step 516 FIG. 5A. If 562 there is a need to replace the sessional key, then the sessional key is replaced 564 using a method similar to one of the methods that are depicted above. After replacing the sessional key, the method 500 waits 566 for period 'D1' and returns to the beginning of the loop, to step 516 FIG. 5A.

Figure 6:
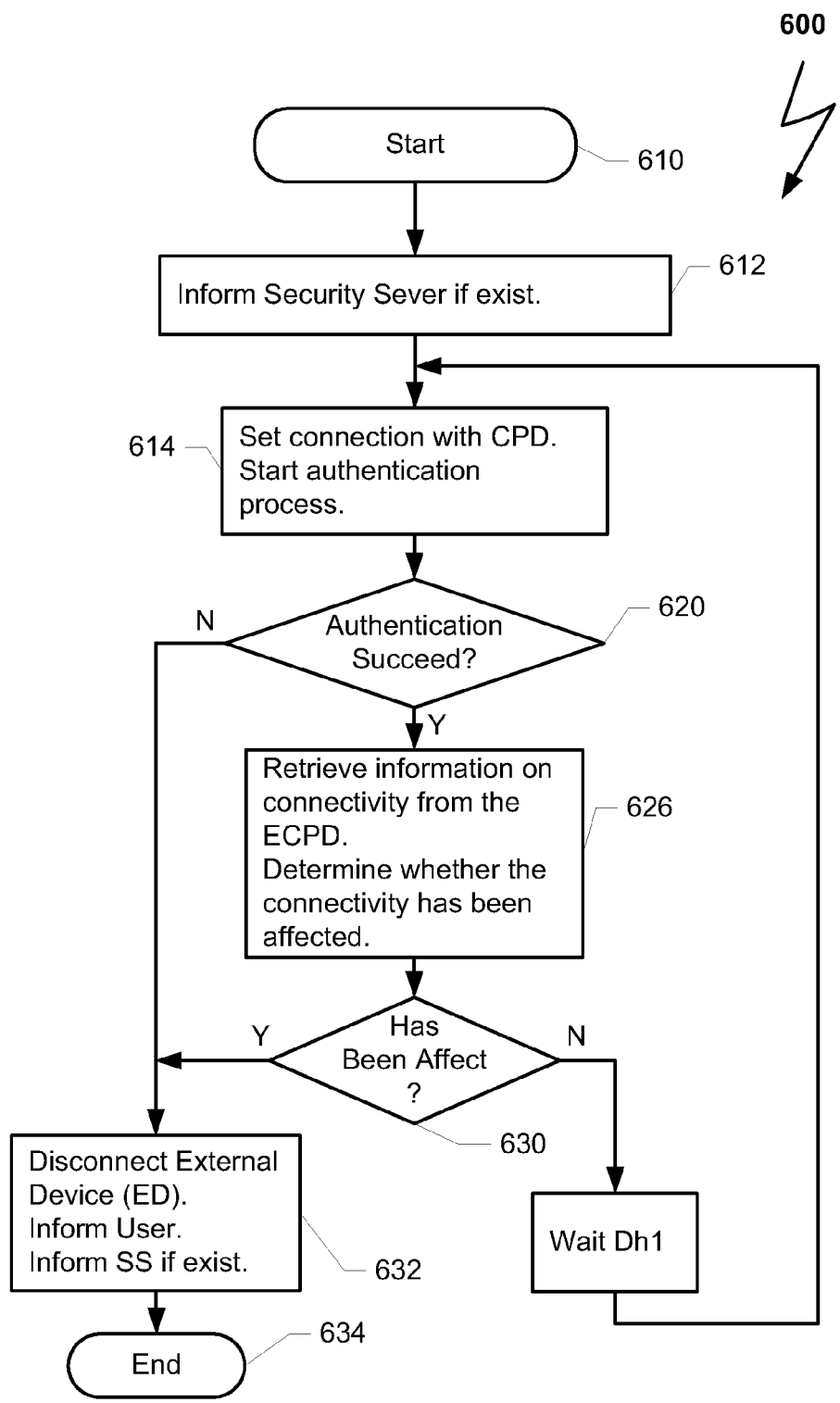
FIG. 6 illustrates a flowchart with relevant steps of an exemplary method for managing an exemplary security agent at a host.

FIG. 6 illustrates a flowchart depicting relevant steps of an exemplary method to verify the installed CPD or connectivity to the CPD has been affected. The method 600 may be used by an exemplary security agent 330 (FIG. 3) for verifying that the installed CPD (ECPD 140 or ICPD 145, FIG. 1) was not affected or that the connection between the external device and the host was not affected. The methods 600 and 500 can run in parallel, independently and not synchronized to eliminate replacing one of the elements (CPD or SA) by a fraud. The method 600 can be initiated after the installation process of the CPD (ECPD 140 or ICPD 145, FIG. 1) as is depicted above. The method 600 can start 610 at the end of a bootstrap process of the host and after the external devices have been introduced to the host.

At step 612 a connection with the security server 130 (FIG. 1) can be established to collect updated information including, but not limited to, am updated policy and/or updated revocation list. If the relevant CPD (ECPD 140 or ICPD 145, FIG. 1) appears in the revocation list, then the method 600 may block the communication with the external device, inform the user and the security server and method 600 can terminate. If the relevant CPD does not appear in the revocation list, the method 600 proceeds to step 614 and starts a loop that runs as long as the host is active.

At step 614 a connection is set with the CPD (ECPD 140 or ICPD 145, FIG. 1) and an authentication process is initiated. The authentication process can be similar to the ones that are disclosed above. Then a decision is made 620 whether the authentication process terminated successfully. If 620 the authentication fails, the security agent may block (or otherwise manipulate) 632 the transportation from/to the appropriate port driver 350a-c (FIG. 3) to/from the appropriate device driver 320a-c (FIG. 3). In addition, an indication regarding entry into such a condition can be sent to the user and/or to the security server. This indication operates to inform relevant processes that the connection between the host and the external device has been manipulated and method 600 terminates 634. At this point, restarting the security agent may require replacing the current ECPD (or the entire external device 113 having an ICPD 145, FIG. 1) or reconfiguring it.

If 620 the authentication stage succeeds, the security agent can retrieve 626 the status of the ECPD, which includes information on the connection between the ECPD and the external device. Based on this information a decision can be made as to whether a disconnection has happened between the ECPD and the external device. In some embodiments of the present invention the status may include information on the connection between the CPD (ECPD 140 or ICPD 145, FIG. 1) and the host. In such an embodiment, the decision can be affected also from the continuity of the connection between the CPD and the host. If 630 the connection was affected then method 600 proceeds to step 632. If the connection was not affected, method 600 may wait for a period 'DH1' and return to the beginning of the loop at step 614. Period 'DH1' can be longer than 'D1', 'DH1' can be in the range of few seconds to few minutes.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

In the description and claims of the present application, the word computer or host computer represent any end user device, which has computing power. It includes among others cellular phones, PDAs, personal computer or other types of end equipment with a CPU that can be connected to external devices.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for controlling data transportation over a physical connection between an external device and a host computer, the method comprising:
   communicatively coupling an external connection protector device (ECPD) in between the external device and the host computer, the ECPD external to the host computer;
   using the ECPD to sense an existence of a physical connection between the external device and the ECPD and between the ECPD and the host computer, wherein the ECPD operates using a power source internal to the ECPD such that the ECPD may be used when the host computer is not operating, and wherein the ECPD comprises a mechanical securing mechanism to permanently secure the connection between the external device and the ECPD by combining the external device and the ECPD into one device;
   determining, based at least in part on the sensing, whether the physical connection has been interrupted; and
   manipulating the data transportation over the physical connection according to a security policy used by the host computer.

2. The method of claim 1, further comprising associating the ECPD with the host computer.

3. The method of claim 1, wherein the step of manipulating the data transportation comprises blocking a transmission of data between the external device and a host computer.

4. The method of claim 1, wherein said sensing the existence of the connection between the external device and the host computer further comprises sensing an existence of a connection between the external device and the ECPD and sensing an existence of a connection between the host computer and the ECPD.

5. The method of claim 1, wherein the step of communicatively coupling the ECPD in between the external device and the host computer further comprises physically connecting or embedding the ECPD to or into the external device and further comprising a step of securing the ECPD to the external device.

6. The method of claim 2, further comprising a step of authenticating the ECPD.

7. The method of claim 6, wherein the step of manipulating the data communication over the connection further comprises blocking the data communication between the external device and the host computer unless the authenticating step is performed.

8. The method of claim 2, further comprising an encryption and/or obfuscating of data communications passing between the ECPD and the host computer and/or the ECPD and the external device.

9. The method of claim 1, wherein the step of sensing the physical connection further comprises electrically sensing the connection and/or mechanically sensing the connection.

10. The method of claim 1, wherein the step of sensing the connection further comprises the steps of:
    sensing existence of a connection between the ECPD and the host computer;
    sensing existence of a connection between the ECPD and the external device; and
    manipulating the data transportation over the connection further comprises:
    manipulating a data transportation between the ECPD and the host computer if a connection between the ECPD and the host computer has been interrupted.

11. The method of claim 1, wherein the external device is a keyboard.

12. A system for protecting data communication between an external device and a host computer, the system comprising:
    an external connection protector device (ECPD) communicatively coupled in between the external device and the host computer, wherein the ECPD operates using a power source internal to the ECPD such that the ECPD may be used when the host computer is not operating;
    a security agent at the host computer that is associated with the ECPD; wherein the ECPD is operative to sense a state of a physical communication path between the external device and the host computer, and upon sensing an interruption of the physical communication path, the system is operative to manipulate the communication according to a security policy used by the host computer, wherein the ECPD comprises a mechanical securing mechanism to permanently secure the connection between the external device and the ECPD by combining the external device and the ECPD into one device.

13. The system of claim 12, wherein the external device is connected to a USB port and/or a PS/2 port.

14. An external connection protector device ECPD for protecting a physical communication path between an external device and a host computer, wherein the ECPD is communicatively coupled in between the external device and the host computer, wherein the ECPD comprises a mechanical securing mechanism to permanently secure the connection between the external device and the ECPD by combining the external device and the ECPD into one device, and wherein the ECPD operates using a power source internal to the ECPD such that the ECPD may be used when the host computer is not operating, the ECPD comprising:
    a plug connector for mating with a receptacle at the host computer;

a connection checker module for checking the continuity of the physical communication path; and a connection manipulator for manipulating the transportation between the receptacle and the plug according to a security policy used by the host computer.

15. The ECPD of claim 14, further comprising a receptacle connector for mating with a plug of a cable of the external device and/or comprising a securing mechanism for securing the plug of the external device with the receptacle of the ECPD.

16. The method of claim 1, comprising manipulating a feature of the external device upon determining the physical connection has been interrupted.

17. The method of claim 1, wherein the ECPD operates using a power source internal to the ECPD such that the ECPD may be used when the host computer is disconnected from the ECPD.

18. The system of claim 12, wherein the ECPD operates using a power source internal to the ECPD such that the ECPD may be used when the host computer is disconnected from the ECPD.

19. The ECPD of claim 14, wherein the ECPD operates using a power source internal to the ECPD such that the ECPD may be used when the host computer is disconnected from the ECPD.

* * * * *